United States Patent
Yuguchi et al.

(10) Patent No.: US 8,085,296 B2
(45) Date of Patent: Dec. 27, 2011

(54) METHOD AND APPARATUS FOR MEASURING AN OPERATING POSITION IN A REMOTE INSPECTION

(75) Inventors: Yasuhiro Yuguchi, Yokohama (JP); Koichi Soma, Yokohama (JP); Takeshi Maehara, Yokohama (JP); Ikuko Kameyama, Yokohama (JP); Tetsuro Nakagawa, Yokohama (JP); Hiroyuki Adachi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 11/470,108

(22) Filed: Sep. 5, 2006

(65) Prior Publication Data

US 2011/0292205 A1    Dec. 1, 2011

(30) Foreign Application Priority Data

Sep. 6, 2005   (JP) .................................. 2005-258301

(51) Int. Cl.
*H04N 7/18* (2006.01)
(52) U.S. Cl. ............................... 348/82; 348/84; 348/85
(58) Field of Classification Search ............. 348/61, 348/82, 84, 85
See application file for complete search history.

(56) References Cited

U.S. PATENT DOCUMENTS

| 4,455,962 A | 6/1984 | Gongwer |
| 5,852,984 A | 12/1998 | Matsuyama et al. |
| 5,878,151 A | 3/1999 | Tang et al. |
| 6,958,767 B2 * | 10/2005 | Olsson et al. ................ 348/82 |

FOREIGN PATENT DOCUMENTS

| JP | 3-78606 A | 4/1991 |
| JP | 3-282203 A | 12/1991 |
| JP | 4-370704 A | 12/1992 |
| JP | 2003-311661 A | 11/2003 |
| WO | WO 02/23122 A1 | 3/2002 |
| WO | WO 2004/094943 A1 | 11/2004 |

OTHER PUBLICATIONS

Japanese Office Action mailed Oct. 15, 2010 in corresponding Japanese Application No. 2005-258301 (with English Translation).

* cited by examiner

*Primary Examiner* — Allen Wong
(74) *Attorney, Agent, or Firm* — Oblon, Spivak, McClelland, Maier & Neustadt, L.L.P.

(57) ABSTRACT

A method of computing an operating position based on a relative distance between a monitor and a movable body correlating data is obtained in advance for determining a one to one correlation between the relative distance and dimensions on the surface of a photographed object of an image. A relative angle is measured between the photographed object and the monitor. The movable body is photographed using a camera of the monitor. The distance and dimensions between reference points on the image are compared with the correlating data coincident with the measured relative angle.

12 Claims, 14 Drawing Sheets

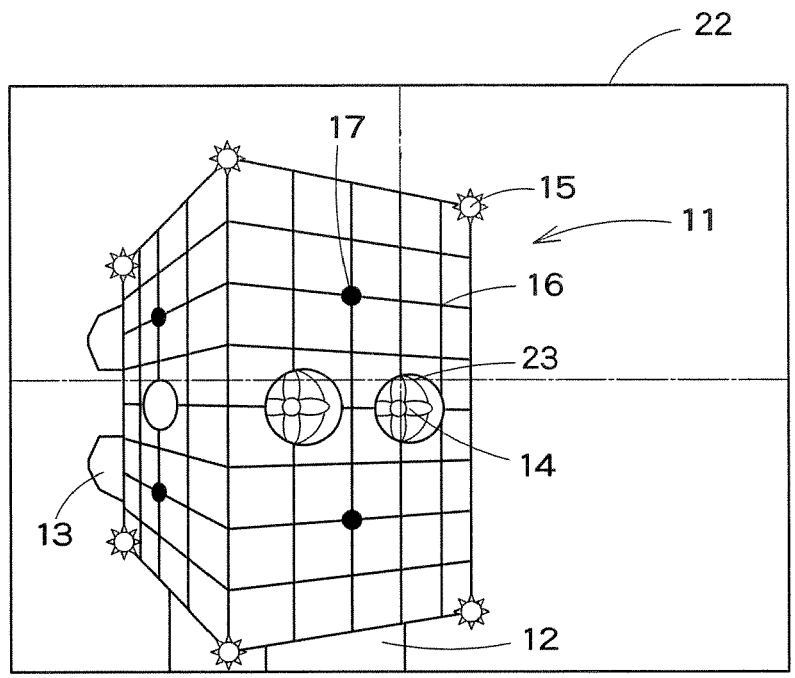
F I G. 2
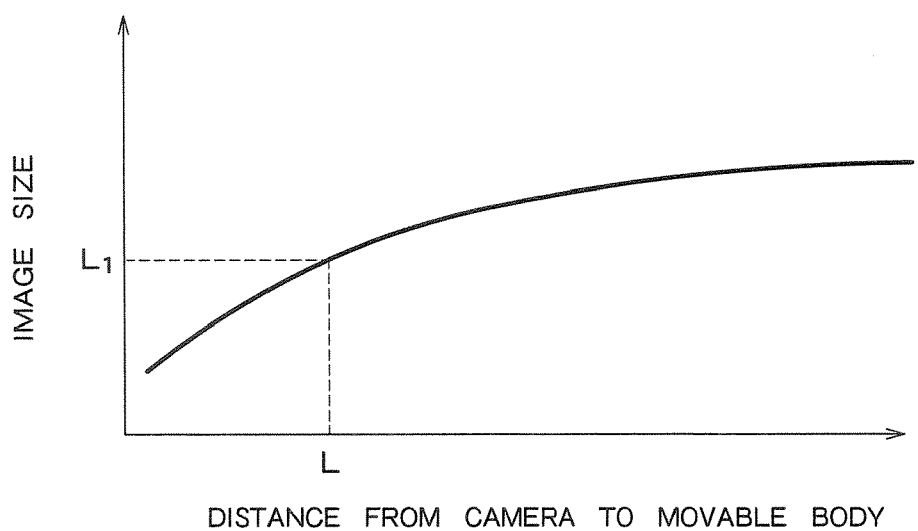
F I G. 3

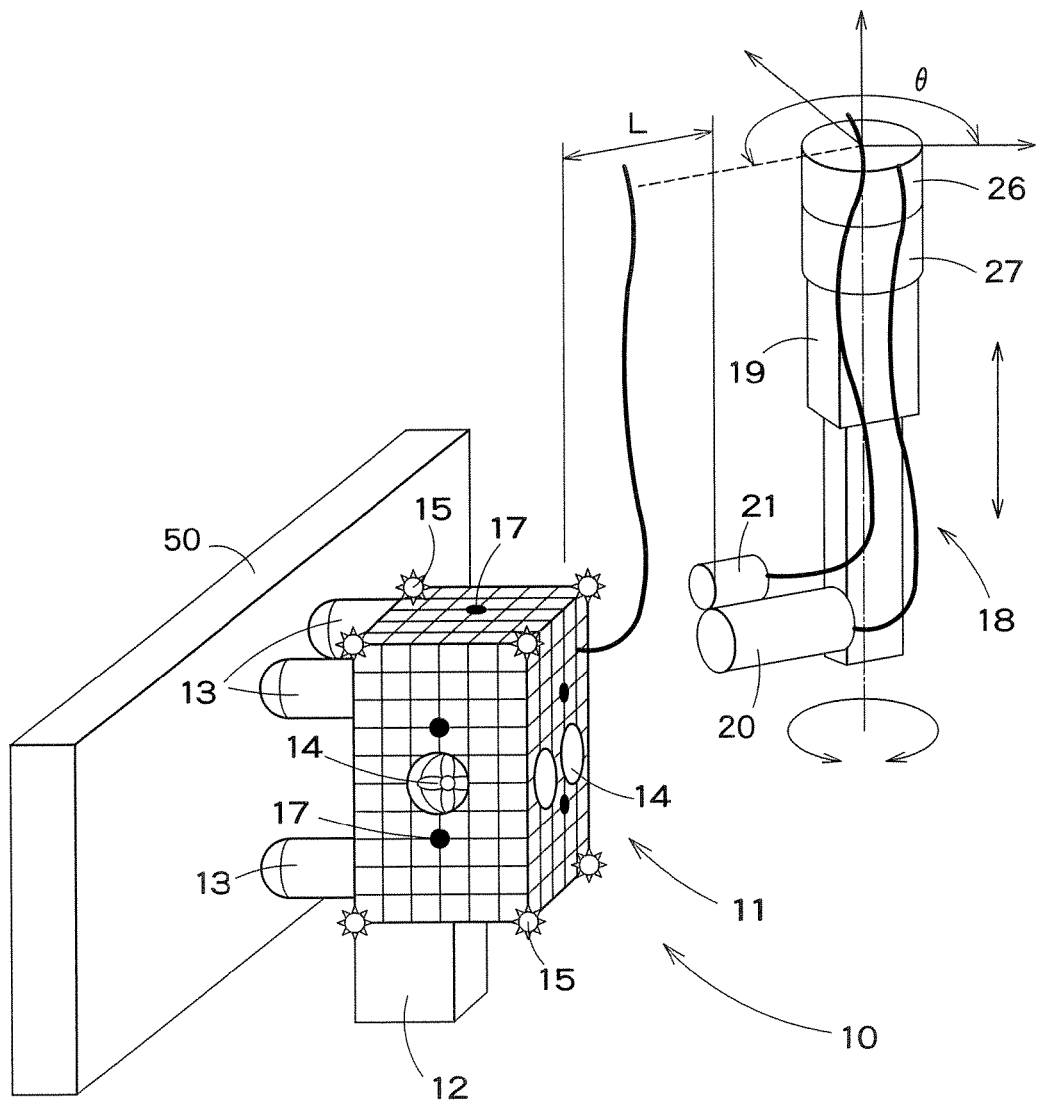
F I G. 5

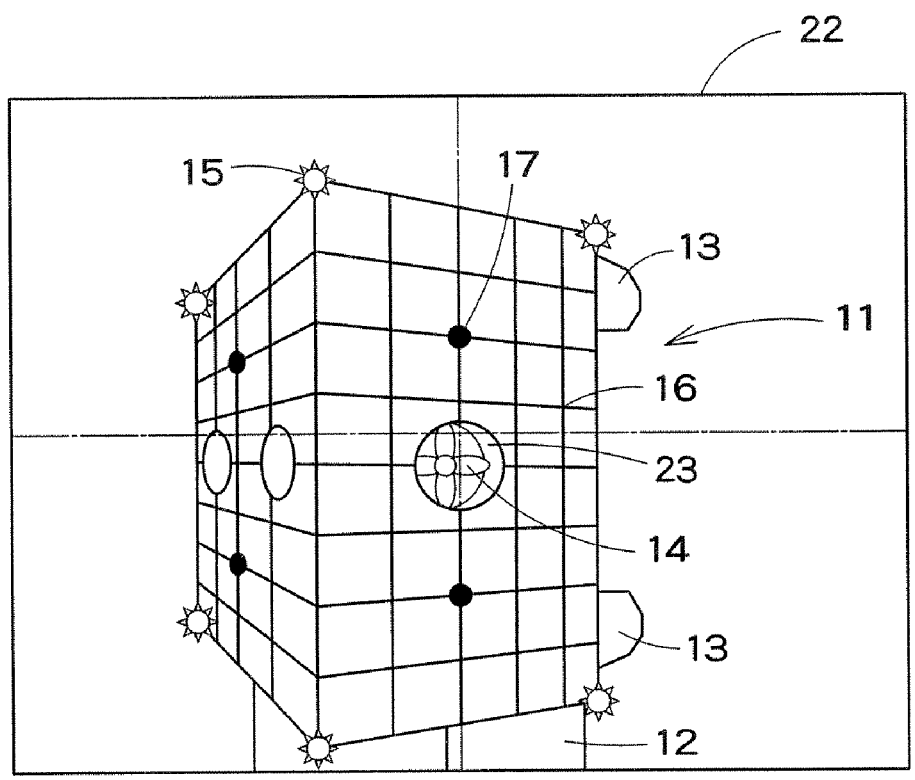
F I G. 6

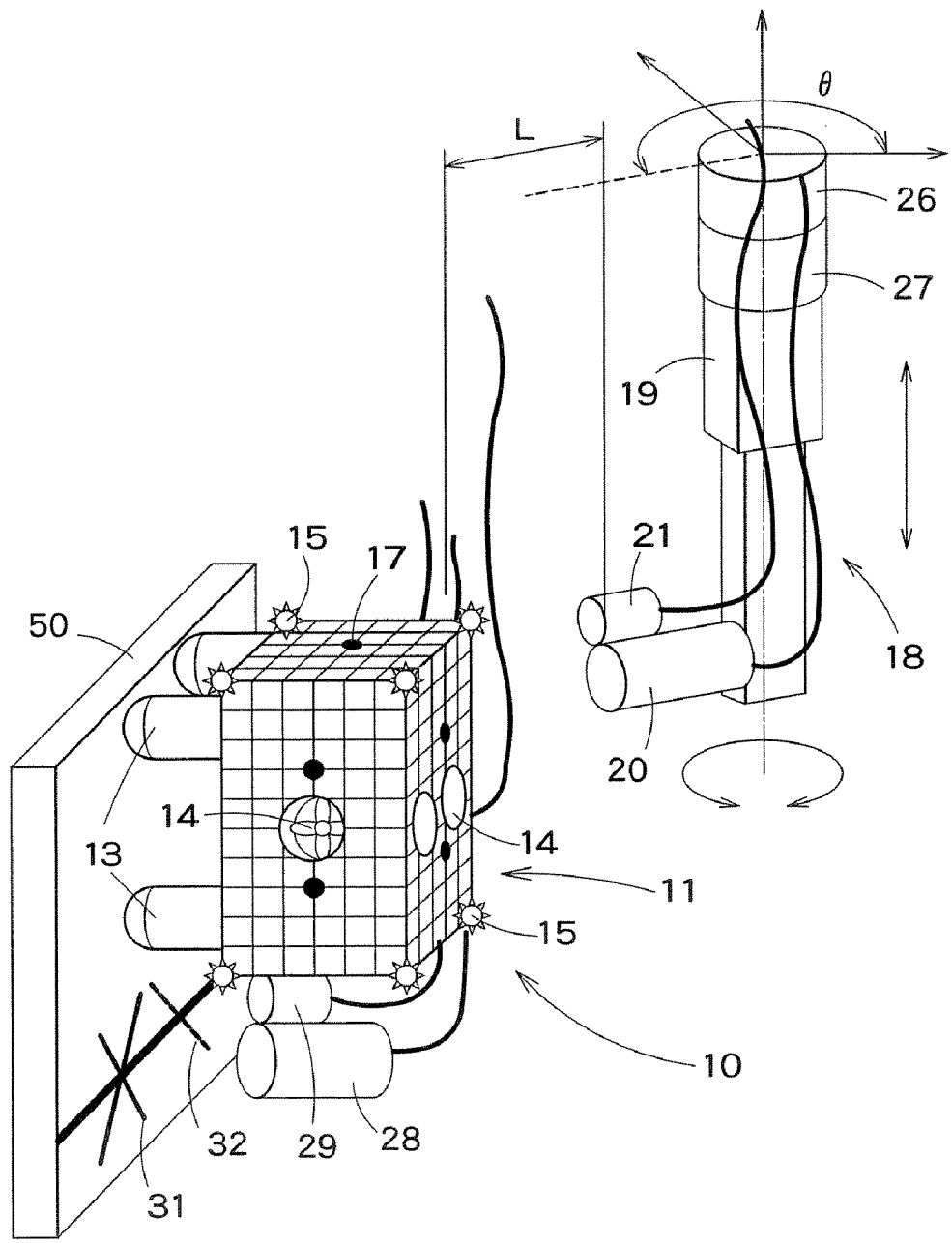
F I G. 7

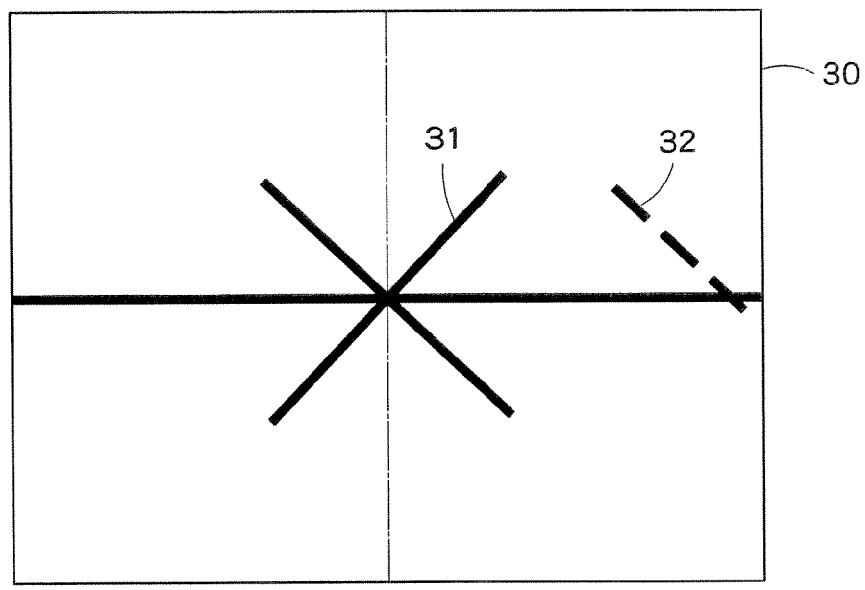
F I G. 8
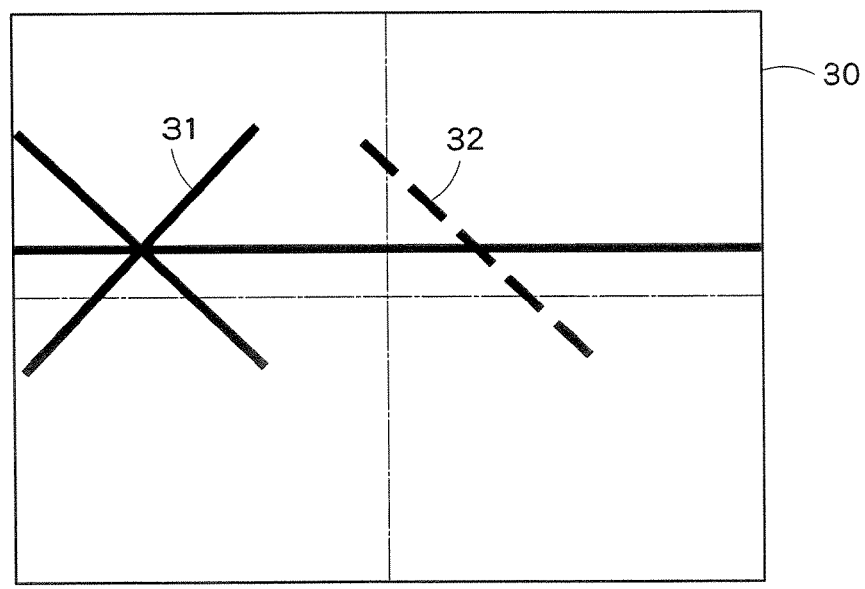
F I G. 9

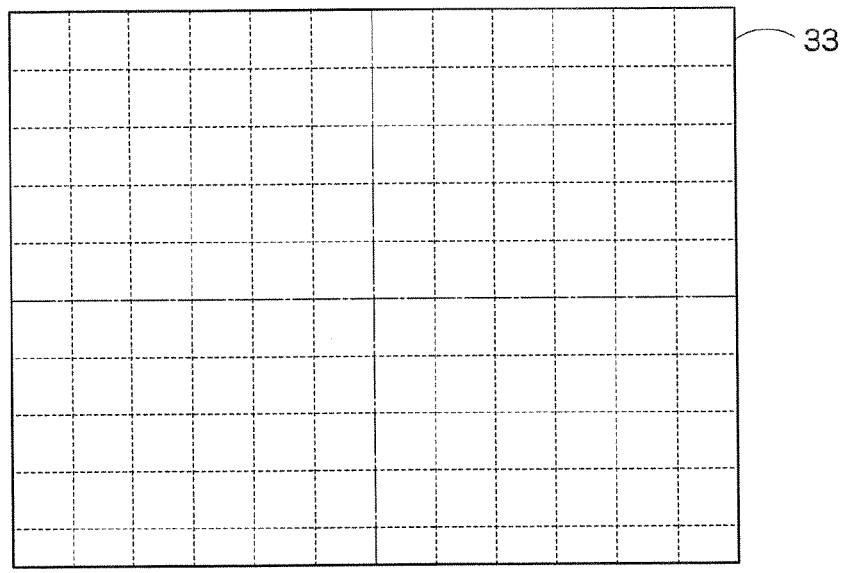
F I G. 10
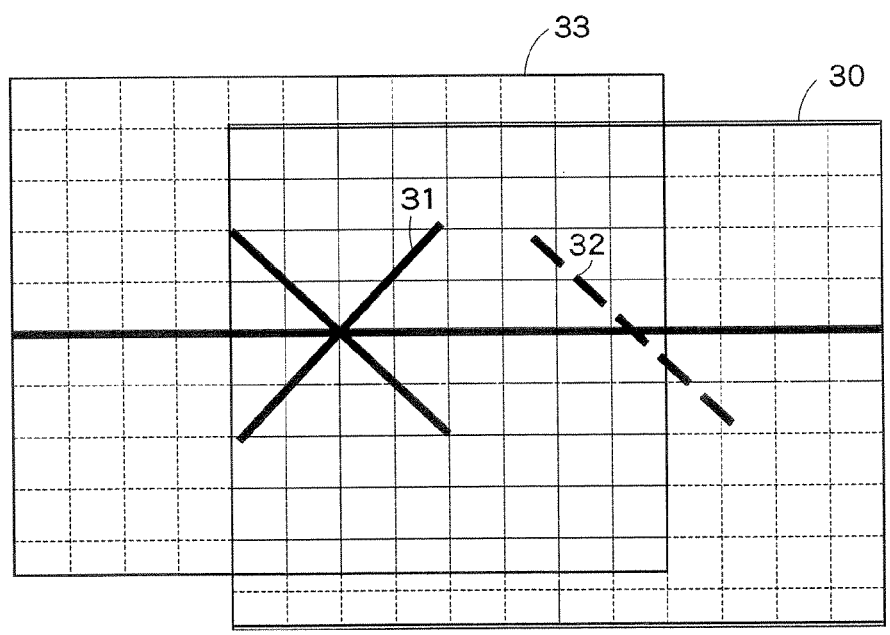
F I G. 11

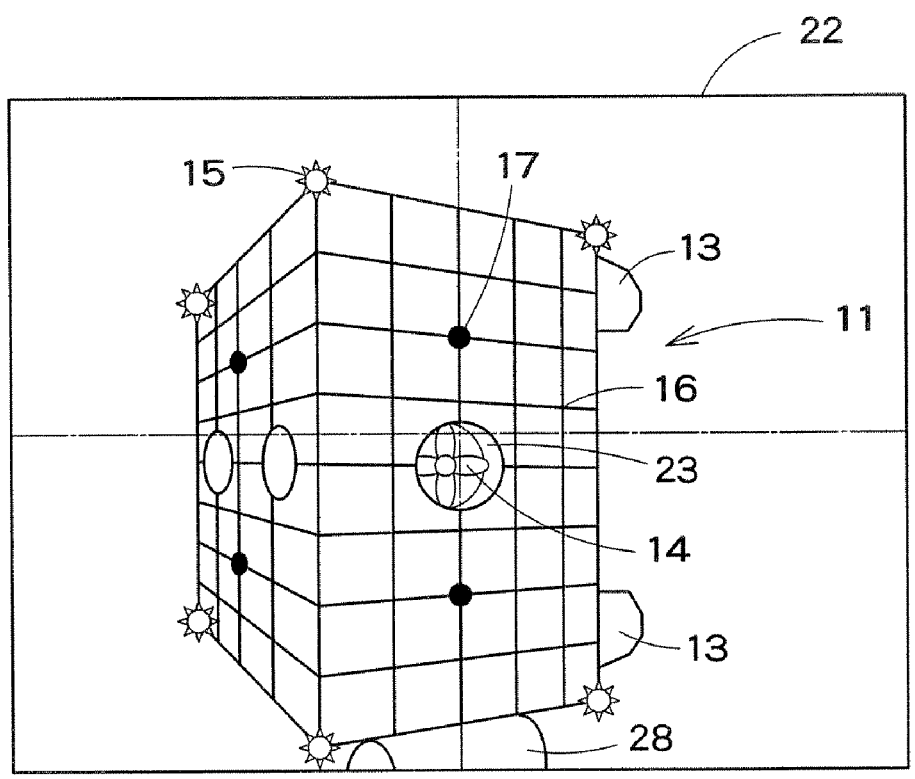
F I G. 12

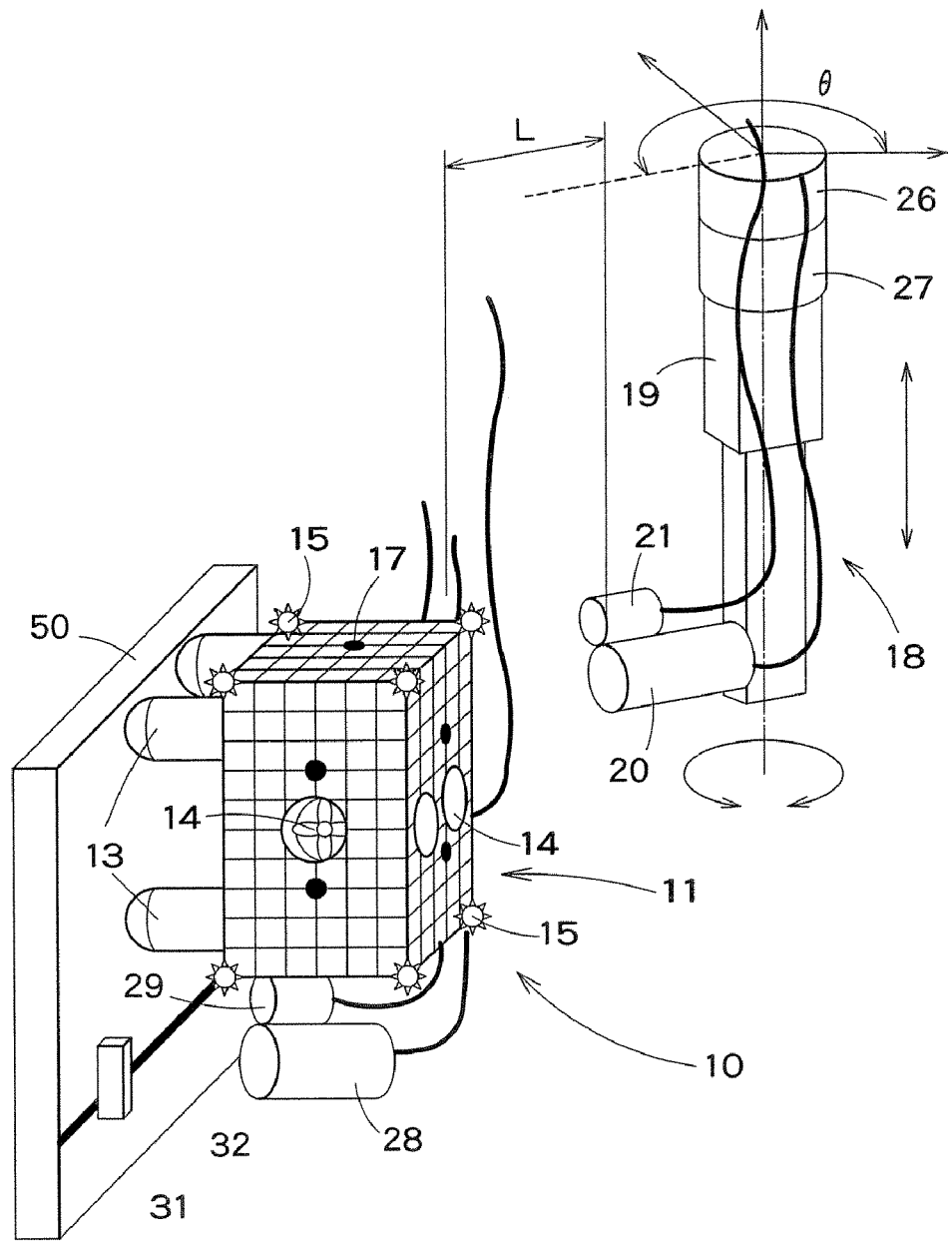
F I G. 13

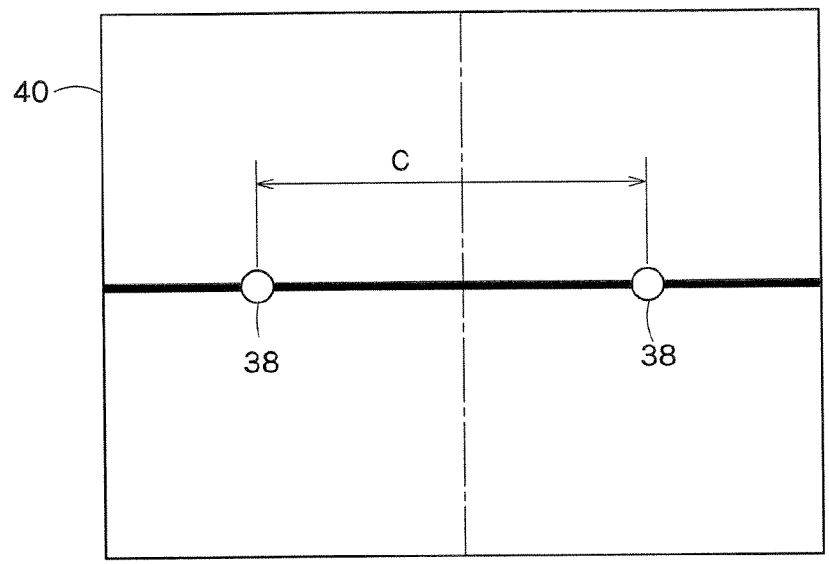
F I G. 16
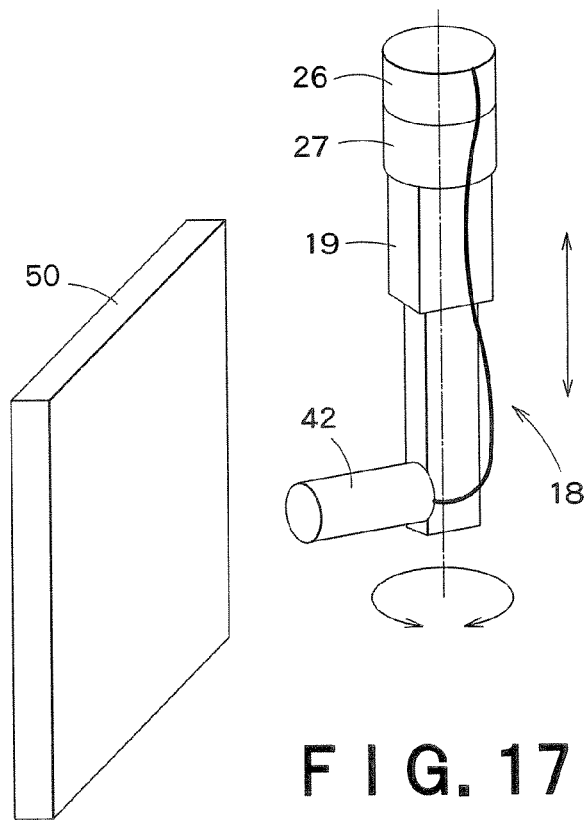
F I G. 17

METHOD AND APPARATUS FOR MEASURING AN OPERATING POSITION IN A REMOTE INSPECTION

BACKGROUND OF THE INVENTION

1. Field of the Invention

The present invention relates to a method and an apparatus for measuring an operating position in a remote inspection, and in particular relates to a method and an apparatus for measuring an operating position to grasp data, such as a position and a length, of a reference point for an object to be inspected or repaired in a place, such as a nuclear reactor, that is difficult for workers to approach.

2. Background Art

Generally, in order to grasp an inspecting position or operating position in a structure or plant, a method in which workers approach a place to be inspected and measure an object using a scale is employed. However, in the case of inspecting and repairing the interior of a pressure vessel of a nuclear reactor or the like, since the workers can not directly approach an object to be inspected, the measurement of its position must be done indirectly by applying some measuring technology.

Conventionally, in the case of measuring a position and a size of a crack in an inner surface of, for example, a shroud for a nuclear reactor, a method has been employed, in which a camera and a lighting are placed in water, a reference structure used as a scale is utilized separately, and an object to be measured is photographed by the camera together with the scale, whereby a position and a size of the crack can be read by comparing the object with the scale from the image.

In recent years, a new standard for maintenance has been provided with respect to the nuclear reactor, resulting in increase of the need for more accurate inspection in the reactor. In this respect, with the conventional measurement using a camera, it was difficult for an inspector to accurately know the really inspecting point from an image displayed on a screen. This is significantly problematic.

To address this problem and enhance accuracy and efficiency of the measurement, there is a method for measuring a position, a shape and dimensions of an object to be inspected by providing a plurality of driving shafts as an robot arm and calculating the position of each driving shaft (Patent Document 1). Also, an approach in which the same target is observed in the three dimensions using a plurality of cameras in order to measure relative distances has been proposed (Non-Patent Document 1).

One example of the prior art for measuring a position and dimensions according to the Patent Document 2 will be described with reference to FIG. 19.

FIG. 19 illustrates a measuring apparatus for use in a method of measuring a position and dimensions by using a three-dimensional or stereoscopic observation. In this measuring apparatus, two light sources 2 for illuminating an object to be measured and two underwater cameras 3 are attached to a distal end of an articulated robot arm 1.

In the measuring apparatus constructed as described above, the positions of the underwater cameras 3 at the distal end are calculated from the displacement amounts of the respective shafts of the arm 1 from a reference structure in a nuclear reactor, and the three-dimensional size is grasped by a stereoscopic observation using the two underwater cameras.

DOCUMENTS CITED

Patent Document 1: Japanese Laid-Open No. 2004-123273

Non-Patent Document 1: "Development of a three-dimensional position standardizing technology by stereoscopic observation using cameras for underwater visual inspection" of Atomic Energy Society of Japan (Meeting of Autumn in 2001) H48

SUMMARY OF THE INVENTION

However, in the aforementioned conventional method for measuring a position and dimensions, in particular, in view of application to a narrow space in a nuclear reactor, a significantly lengthened arm must be used when the need for approaching a face to be measured or target face exists, leading to a large scale preparation and a time-consuming operation. In addition, the range of access for utilizing the arm must be limited.

The present invention was made to solve such problems of the prior art, and therefore an object of this invention is to provide a method and an apparatus of measuring an operating position, which can effect measurement of dimensions with ease based on an image photographed by a camera.

To achieve the above object, the feature of claim 1 of the present invention is a method of measuring an operating position for performing an inspection through remote operation to a target face in which a general profile of the surface is already known, the method comprising the steps of: contacting a movable body capable of being kept at a constant relative distance and relative angle with respect to the target face and having reference points for use in positional measurement on its surface; providing a monitor, having a camera and a lighting, at any given reference point whose relative position with respect to the target face is already known; accumulating in advance image data to be obtained by photographing the movable body, under an optical environment similar to that around the target face, at any given relative angle or relative distance, between the movable body and the monitor for the positional measurement; obtaining in advance correlating data, based on the image data, for determining a one to one correlation between the relative distance, at any given relative angle or relative distance, between the movable body and the monitor for the positional measurement and the distance and dimensions on the surface of the photographed object in the image; measuring the relative angle between the photographed object and the monitor; photographing the movable body using the camera of the monitor, and calculating the relative distance between the monitor and the movable body by comparing the distance and dimensions between the reference points in the image with the correlating data coincident with the measured relative angle; and calculating the operating position of the movable body for the positional measurement, based on the relative position, relative distance and relative angle of the monitor.

The feature of claim 2 of the present invention is a method of measuring an operating position for performing an inspection through remote operation to a target face in which a general profile of the surface is unknown, the method comprising the steps of: contacting a movable body capable of being kept at a constant relative distance and relative angle with respect to the target face and having reference points for use in positional measurement on its surface; providing a monitor, having a camera and a lighting, at the origin of coordinate axes; accumulating in advance image data to be obtained by photographing the movable body, under an optical environment similar to that around the target face, at any given relative angle or relative distance, between the movable body and the monitor for the positional measurement; obtaining in advance correlating data, based on the image data, for determining a one to one correlation between the relative distance, at any given relative angle or relative distance, between the movable body and the monitor for the positional measurement and the distance and dimensions on the surface of the movable body in the image; obtaining the relative angle by comparing the image of the photographed movable body with the image data; photographing the movable body using the camera of the monitor, and calculating the relative distance between the monitor and the photographed object by comparing the distance and dimensions between the reference points in the image with the correlating data coincident with the obtained relative angle; and calculating the operating position of the movable body for the positional measurement, based on the relative position, relative distance and relative angle of the monitor.

The feature of claim 3 of the present invention is the method according to claim 1 or 2, wherein an auxiliary camera and a lighting are provided to the movable body, and the method further comprising the steps of: obtaining a relative distance and a relative angle between the auxiliary camera and the target face; assuming a target face corresponding to the distance and angle measured in advance between the auxiliary camera and the target face, and preparing a scale image data in advance, on which a scale display such as a mark corresponding to specific dimensions or coordinates is provided; and measuring dimensions of a shape of a feature point on the target face by superimposing the scale image data on an image of an actual target face photographed using the auxiliary camera.

The feature of claim 4 of the present invention is the method according to claim 3, wherein a scale display of dimensions obtained from a proportional calculation is provided in an image of the target face, using a mark such as a known structure or pattern as a reference, which is provided on the target face.

The feature of claim 5 of the present invention is a method of measuring an operating position for performing an inspection through remote operation to a target face in which a general profile of the surface is known or unknown, the method comprising the steps of: contacting, with the target face, a movable body for the positional measurement, which can be kept at a constant relative distance and relative angle with respect to the target face and includes a running mechanism for self-propelled operation, a camera and a lighting; accumulating in advance image data to be obtained by photographing the target face, at any given relative angle and relative distance, between the camera of the movable body and the target face; preparing a standard size lattice as a scale display of dimensions in an image obtained from the image data coincident with the relative distance and the relative angle by comparing the image of the photographed target face and the image data; and measuring the dimensions and position of a shape of a feature point shown in the image of the target face while superimposing the standard scale lattice on the image and allowing the movable body to be self-propelled.

In the invention according to any one of claims 1 to 5, when there is a feature point, such as welding beats, grinder processed traces, cracks or cladding peeled traces, on the target face, the range for measuring dimensions may be enlarged by moving the target to be measured for its position and arranging at least two images in which photographing ranges are overlapped.

The feature of claim 7 of the present invention is an apparatus of measuring an operating position for performing maintenance including inspection and repair or the like through remote operation to a target face in which a general profile of the surface is known or unknown, the apparatus comprising: a working unit including a movable body which includes reference points for positional measurement on its surface and can be freely moved by remote operation, a means for constantly keeping the relative distance and the relative angle between the target face and the movable body, and an effector for effecting predetermined operations to the target face; a monitor which includes a camera and a lighting and is set at any given reference point; an image data storing means for accumulating in advance image data to be obtained by photographing the movable body, under an optical environment similar to that around the target face, at any given relative angle or relative distance, between the movable body and the monitor for the positional measurement; a correlating data storing means for obtaining and accumulating in advance correlating data, based on the image data, for determining a one to one correlation between the relative distance, at any given relative angle or relative distance, between the movable body and the monitor for the positional measurement and the distance and dimensions between the reference points on the surface of the movable body in the image; a verification means for obtaining the relative angle, by calculating the relative distance between the monitor and the movable body by comparing the distance and dimensions between the reference points in the image of the movable body photographed by the camera of the monitor and the correlating data corresponding to the measured relative angle, or by comparing the image of the photographed movable body with the image data corresponding to the measured relative distance; and a position computing means for calculating the position of the movable body for the positional measurement, based on the relative position, relative distance and relative angle of the monitor.

The feature of claim 11 of the present invention is an apparatus of measuring an operating position for performing maintenance including inspection and repair or the like through remote operation to a target face in which a general profile of the surface is known, the apparatus comprising, a measurement working unit including a movable body which includes reference points for positional measurement on its surface and can be freely moved by remote operation, a means for constantly keeping the relative distance and the relative angle between the target face and the movable body, and a camera and a lighting for performing a visual inspection of the target face, an image data storing means for accumulating in advance image data to be obtained by photographing the target face, under an optical environment similar to that of the target face, at any given relative angle or relative distance, between the camera of the measurement working unit and the target face, a verification means for obtaining the relative distance and the relative angle, by comparing an image of the photographed target face with the image data, and a position computing means adapted to prepare a standard size lattice to be used as a reference scale of dimensions in the image based on the relative distance and the relative angle and calculate the dimensions and the position of a shape of a feature point shown in the image of the target face while superimposing the standard scale lattice on the image and allowing the movable body to be self-propelled.

According to the invention set force in claim 1, the monitor including a camera and a lighting is provided at a reference position whose relative position with respect to a target face is already known, and the relative distance and relative angle between the movable body and the monitor can be obtained based on an image in which appearance of the movable body for positional measurement is photographed using the camera as well as on correlating data prepared in advance for the distance and dimensions and the relative distance in the image. Thus, the operating position can be measured with ease, even without performing complicated three-dimensional calculations.

According to the invention set force in claim 2, the monitor including a camera and a lighting is provided at the origin of coordinates, and the relative distance and relative angle between the movable body for positional measurement and the monitor can be obtained based on an appearance image of the movable body photographed using the camera as well as on correlating data prepared in advance for the distance and dimensions and the relative distance in the image. Thus, the position of the apparatus for positional measurement can be measured with ease, even without requiring any driving means such as a motor for the monitor, and even in the case where prediction of the position of the object to be measured is difficult or in the case where the object is moving.

According to the invention set force in claim 3, not only the position of the movable body for positional measurement can be readily measured, but also the measurement of dimensions of a target face including an end portion of a crack upon visual inspection can be performed with ease.

According to the invention set force in claim 4, measurement of an absolute position can be facilitated using a known structure or mark as a reference, which is already present on the target face, and measurement of an operating position and dimensions for the target face becomes possible even if the position of the monitor can not be obtained distinctly.

According to the invention set force in claim 5, even without using the monitor, measurement of dimensions and position for the target face can be performed due to an image obtained from the camera provided to the movable body.

According to the invention set force in claim 6, even if an object to be measured is too large to fit in a camera image at once, measurement of dimensions can be performed with ease, even without using the monitor, based on the distance of transfer of the movable body and a scale defined corresponding to the visible angle of the camera, thereby enlarging the range enabling to measure dimensions with high image accuracy.

According to the invention set force in claim 7, without using an arm such as a robot arm, measurement of a position or shape on the target face, which is difficult to access, can be performed with ease by utilizing an image of the camera.

According to the invention set force in claim 8, by superimposing a plurality of images in which the distance between the camera and the target face is the same, a camera image which is possibly suitable for verification relative to the correlating data can be obtained, thereby enabling measurement of dimensions and position of a feature point without using the monitor.

BRIEF DESCRIPTION OF THE DRAWINGS

FIG. 2 is a diagram showing an image obtained from a monitor in the state shown in FIG. 1.

FIG. 3 is a graph illustrating one example of image-size correlating data (a graph showing a relationship between a distance to a target face and dimensions in the image).

FIG. 5 is a diagram illustrating the entire construction of an apparatus for carrying out a method of measuring an operating position according to a third embodiment of the present invention.

FIG. 6 is a diagram showing an image obtained from a monitor in the state shown in FIG. 5.

FIG. 7 is a diagram illustrating the entire construction of an apparatus for carrying out a method of measuring an operating position according to a fourth embodiment of the present invention.

FIG. 8 is a diagram showing an image obtained from a camera on a movable body in the state shown in FIG. 7.

FIG. 9 is a diagram showing an image obtained from the camera on the movable body in the state shown in FIG. 7.

FIG. 10 is a diagram illustrating a standard size lattice pattern (scale template) which was obtained in advance.

FIG. 11 is a superimposed view of a camera image obtained from an object to be measured for its position and the standard size lattice pattern of FIG. 10.

FIG. 12 is a diagram showing an image obtained from a monitor in the state shown in FIG. 7.

FIG. 13 is a diagram illustrating the entire construction of an apparatus for carrying out a method of measuring an operating position according to another example of the fourth embodiment of the present invention.

FIG. 16 is a diagram showing an image obtained from a camera on a movable body in the state shown in FIG. 15.

FIG. 17 is a diagram illustrating the entire construction of an apparatus for carrying out a method of measuring an operating position according to one example of the fifth embodiment of the present invention.

Hereinafter, embodiments of a method and an apparatus for measuring an operating position according to the present invention will be described with reference to the accompanying drawings.

DETAILED DESCRIPTION OF THE PREFERRED EMBODIMENTS OF THE INVENTION

First Embodiment

Figure 1:
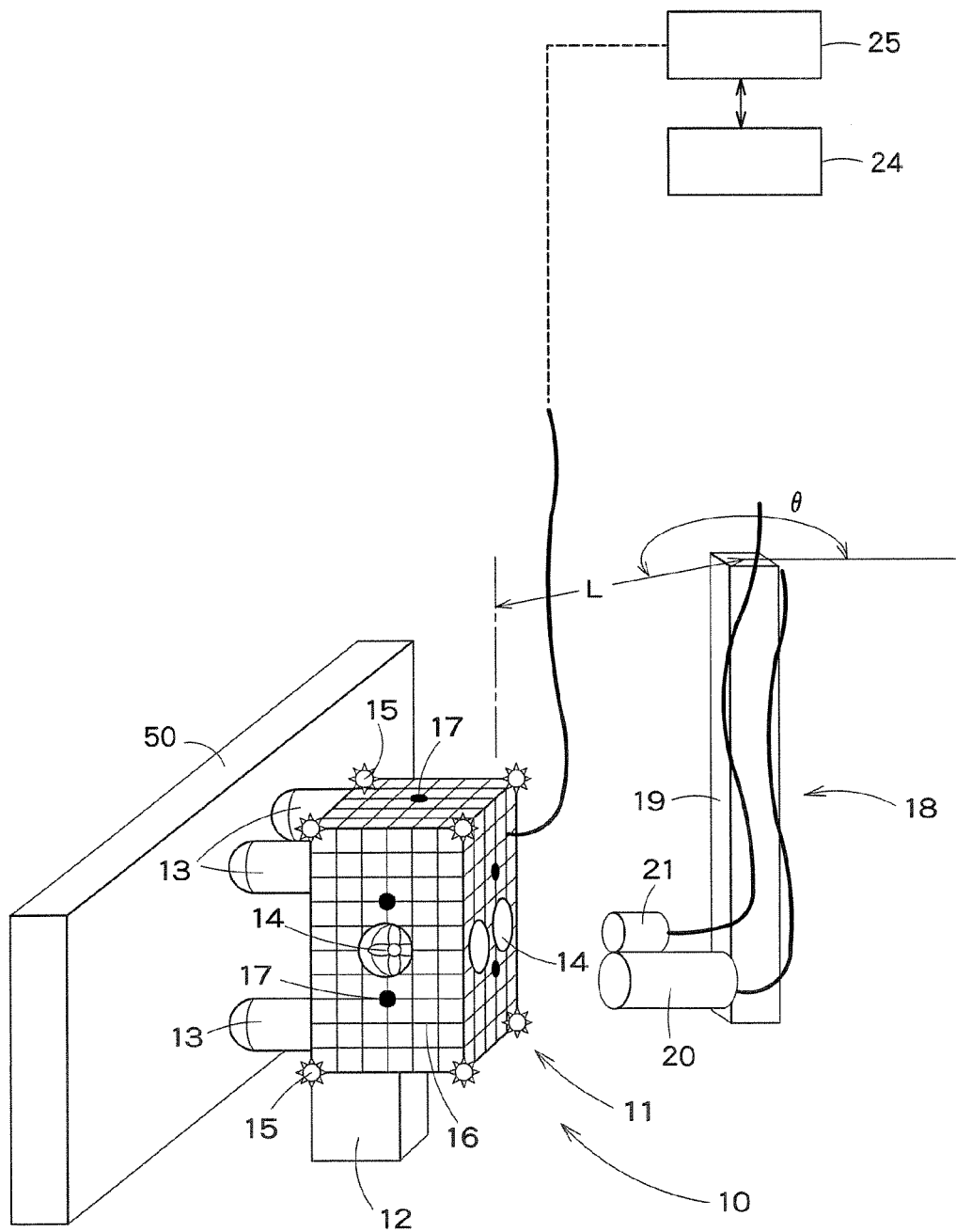
FIG. 1 is a diagram illustrating the entire construction of an apparatus for carrying out a method of measuring an operating position according to a first embodiment of the present invention.

FIG. 1 illustrates a measurement apparatus for carrying out a method of measuring an operating position according to a first embodiment of the present invention.

This embodiment is configured to grasp a current operating position in the case where maintenance such as a visual inspection and repair is performed through remote operation using an underwater camera, for example, in a pressure vessel for an atomic power generating installation.

In FIG. 1, reference numeral 50 denotes a target face to be maintained or subjected to maintenance. In this case, a general profile of the target face 50 is already known. Reference numeral 10 designates the entire body of an apparatus for carrying out maintenance, such as visual inspection, sampling, testing, removing deficiencies, repairing or welding, prevention or preservation, while moving along the target face 50. Generally classified, the apparatus 10 comprises a movable body 11 adapted to move in water due to remote operation, and an effector 12 constituting a means for performing the aforementioned maintenance. In this embodiment, interfering bodies 13 for supporting the movable body at four points, as a means for constantly keeping the relative distance and the relative angle with respect to the target face 50, are attached to the movable body 11. In addition, the movable body 11 includes propellers 14 and lightings 15 wherein the propellers 14 are adapted to generate driving force for moving the movable body 11 and another driving force for pressing the interfering bodies 13 of the movable body 11 against the target face 50.

In this embodiment, the movable body 11 has a rectangular shape, and in each of the five faces except for the face to which the interfering bodies 13 are attached, scales 16 are provided and reference points 17 for positional measurement are marked at appropriate positions. The position and angle of the movable body 11 are already known either by measurement of attitude angles relative to arbitrary orthogonal two axes using an inclinometer (not shown) or by keeping them substantially constant relative to the offset of the center of buoyancy and the center of gravity. Also, the operating point of the effector 12, and the relative attachment positions of lightings 15, reference points 17, scales 16 and interfering bodies 13, attached to the movable body 11, are already known.

Reference numeral 18 denotes a monitor for photographing the movable body 11 using a camera to obtain an image to be used for positional measurement. To a main frame 19 of the monitor 18 a camera 20 and a lighting 21 are attached. The monitor 18 of this first embodiment is provided at a reference point P, the position from which to the target face 50 being already known. In this monitor 18, the relative position and angle of attachment of the camera 20 with respect to the reference point is already measured and known.

In FIG. 2, a camera image 22 is shown, in which the movable body 11 is photographed by the camera 20 of the monitor 18. If a photograph is taken in a state where the respective interfering bodies 13 are in contact with the target face 50, the camera image 22 will vary when the relative distance and relative angle between the camera image 20 and the target face 50 differs.

Accordingly, with various changes of the angle and distance between the target face 50 and the camera 20 of the monitor 18, image data (not shown) are obtained in advance by photographing the movable body 11 in a variety of positions and angles under an environment related to a reflective index of light similar to that around an actual operating site.

FIG. 3 is a graph illustrating one example of image-size correlating data obtained from the image data grasped in advance as described above.

In the image-size correlating data, when a relative angle of the movable body 11 with respect to the optical axis of camera 20 is given, the correlation of the image size corresponding to the distance between the camera 20 and the movable body 11 is shown. In FIG. 3, the horizontal axis expresses the distance from an intersection 23 of central axes of the camera 20 and the photographed face of the movable body 11, while the vertical axis designates the image size.

In FIG. 1, reference numeral 24 designates a storage device in which the aforementioned image data and image-size correlating data are accumulated and stored, and reference numeral 25 is an computing unit adapted to calculate the relative distance and relative angle between the monitor 18 and the movable body 11 by comparison to the correlating data and then calculate the position in which the movable body 11 is actually present.

Next, a method of measuring an operating position will be explained, which is executed by using the operating position measurement apparatus of the first embodiment constructed as described above.

First, the propellers 14 are actuated by remote operation to move the movable body 11 toward the target face 50, thereby contacting the interfering bodies 13 of the movable body 11 with the target face 50. While maintaining this contact state, the movable body 11 can keep a predetermined distance at a preset attitude angle relative to the target face 50. Optionally, the propellers 14 may be actuated to adjust the stop position.

Next, the movable body 11 is photographed by the camera 20 of the monitor 18. As a result, the camera image 22, as shown in FIG. 2, can be obtained. In order to obtain such a clear image, the installation position of the monitor 18 may be adjusted.

At the time, since the attitude angle between the target face 50 and the movable body 11 and the position and angle of the monitor 18 relative to the reference point P are known previously, the relative angle of the movable body 11 with respect to the central axes of the camera 20 can be computed from these data.

By referring to the image-size correlating data corresponding to the computed relative angle, the relative distance between the camera 20 and the movable body 11, i.e., the distance from the intersection 23 of central axes of the camera 20 to an outer surface of the movable body 11 is obtained. For example, if an image size $L_1$ is determined, in FIG. 2, as any given relative distance of lightings 15, reference points 17 and the scales 16 in the camera image 22, the distance L from an outer surface of the movable body 11 to the intersection 23 of central axes of the camera 20 can be obtained from the graph of FIG. 3.

Since any given coordinates of the target face 50 are already known and the movable body 11 is kept at a predetermined distance from the target face 50 when the respective interfering bodies 13 of the movable body 11 are in contact with the target face 50, any coordinates of the lightings 15, reference points 17, scales 16, which may be present on an outer surface of the movable body 11, can be obtained in advance. In this way, coordinates on which the movable body 11 is actually present can be calculated from the data of the distance between the intersection 23 of central axes of the camera 20 and the movable body 11 or from the previously grasped directing angle of the camera 20 of the monitor 18.

Thereafter, from the attitude of the movable body 11 and the coordinates of the reference points 17, the coordinates of the operating point of the effector 12 can be calculated. Optionally, the propellers 14 may be actuated to move, adjust and position the operating point of the effector 12.

As stated above, according to this embodiment, if relative coordinates of the target face 50 with respect to the monitor 18 are grasped in advance, the coordinates of attitude and existence of the movable body 11 can be determined by driving the movable body 11 to make the interfering bodies 13 contact with the target face 50. Accordingly, by obtaining the relative angle of the monitor 18 with respect to the target face 50 when the whole portion or a part of the movable body 11 is shown in the camera image 22 and deriving the relative distance between the movable body 11 and the monitor 18 from the image size in the camera image 22 taken on the camera 20, the coordinates of the operating point due to the movable body 11 or effector 12 can be calculated with ease, without employing complicated three-dimensional calculation.

Thus, by using the movable body 11 including the propellers 14, which can be freely moved in a space, rather than using an apparatus connected with articulating shafts from a reference point as seen in a manipulator, various operations targeting specific coordinates can executed. Also, upon inspection or the like, coordinates of any target point can be obtained.

Second Embodiment

Next, a method of measuring an operating position according to a second embodiment will be described with reference to FIG. 4.

Figure 4:
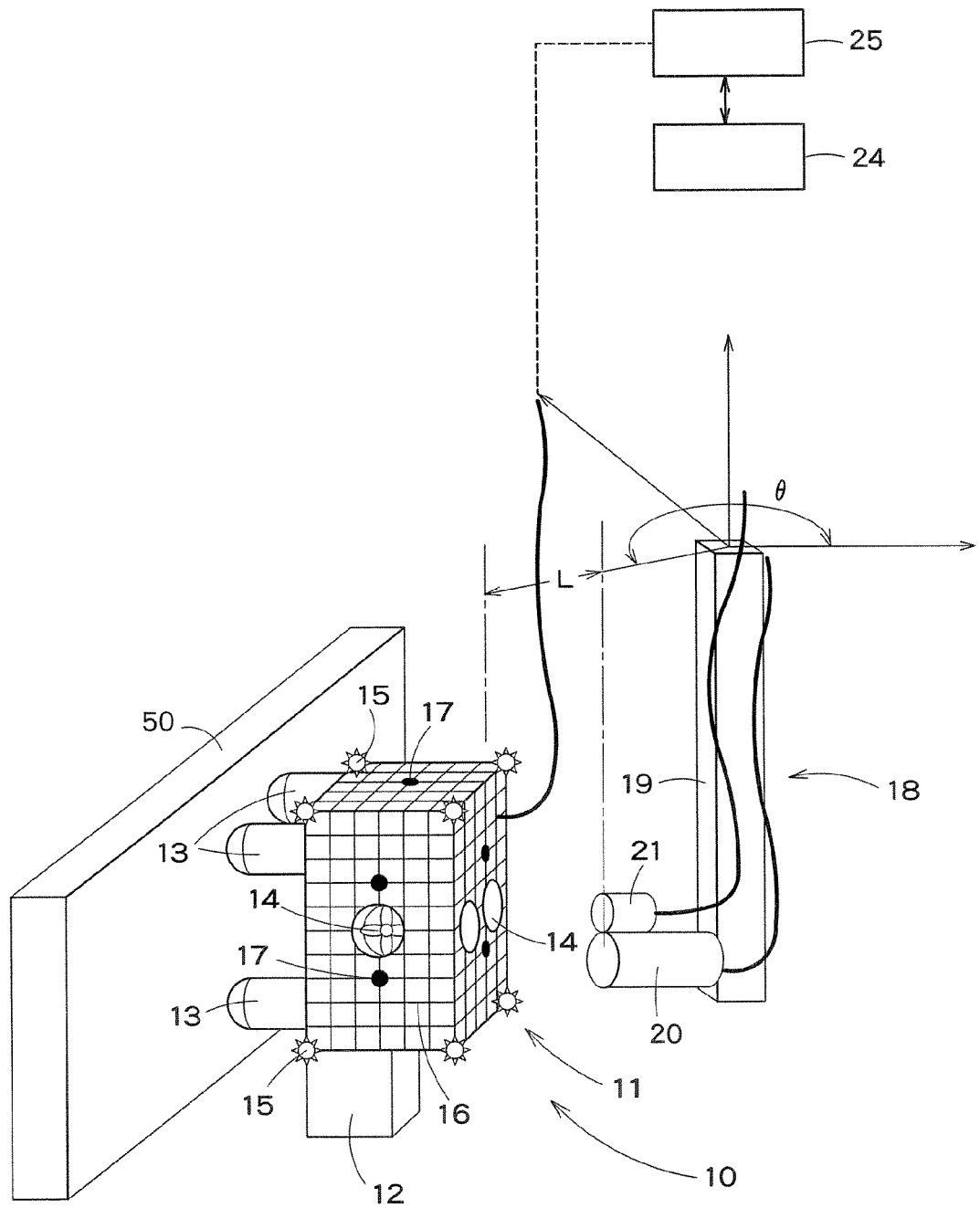
FIG. 4 is a diagram illustrating the entire construction of an apparatus for carrying out a method of measuring an operating position according to a second embodiment of the present invention.

In FIG. 4, the movable body 11 used for measuring an operating point in the second embodiment is the same, in itself, as the movable body 11 shown in FIG. 1. Similarly, like components are designated by like reference numerals, and their explanations will be omitted here.

In the case of the second embodiment, the most different point as compared with the first embodiment is that in the first embodiment a general profile of the target face 50 is already known, while in the second embodiment, it is not necessary to specify in advance the target face 50. In addition, there is no need for measuring the attitude angle relative to any given orthogonal two axes of the movable body 11 using an inclinometer (not shown) or for keeping them substantially constant relative to the offset of the center of buoyancy and the center of gravity.

In respect to the monitor 18, though the construction including a camera 20 and lightings 21 is the same as the first embodiment, the installation point is different from the first embodiment. Namely, the monitor 18 in the first embodiment is provided at the reference point P, the relative position at which from the target face 50 being already known, while in the second embodiment, since the profile of the target face itself is not specified, the installation point of the monitor 18 is defined, as shown in FIG. 4, as the origin of coordinate axes in a coordinate system which has been determined in advance.

In the second embodiment, unlike the first embodiment, since the target face 50 is not specified in advance, when the monitor 18 is provided at the origin of coordinate axes, the distance L from the intersection 23 of central axes of the camera 20 to the movable body 11 and the relative angle θ of the camera 20 with respect to the movable body 11 are unknown.

In this case, the relative angle θ can be obtained by utilizing image data previously obtained by photographing the movable body 11 in a variety of positions and angles under an environment related to a reflective index of light similar to that around an actual operating site, with various changes of the image data accumulated in the storage device 24, i.e., the angle and distance between the movable body 11 and the camera 20 of the monitor 18.

The method of obtaining the relative distance L between the movable body 11 and the camera 20 is the same as in the first embodiment in that it can be obtained, as shown in FIG. 3, by utilizing image-size correlating data to be obtained from the image data of them which was obtained in advance.

Next, a method of measuring an operating position according to the second embodiment constructed as described above will be explained.

First, the propellers 14 are actuated by remote operation to move toward the target face 50 so as to contact the interfering bodies 13 of the movable body 11 with the target face 50. While keeping such a contact state due to the driving force of the propellers 14, the movable body 11 can keep a predetermined distance at a preset attitude angle relative to the target face 50. Optionally, the propellers 14 may be actuated to adjust the stop position. At this time, the camera image 22 obtained from the camera 20 of the monitor 18 becomes as shown in FIG. 2, and this is the same as in the first embodiment.

Next, to obtain the unknown relative angle θ of the movable body 11 with respect to the camera 20, the computing unit 25 compares the image data accumulated in the storage device 24 and the camera image of the photographed movable body 11. If the image is coincident with the image data, the current relative angle θ of the movable body 11 with respect to the camera 20 will be the relative angle at the time the image data was photographed, and as such obtaining the relative angle θ.

Then, the method of obtaining the relative distance L between the camera 20 and the movable body 11 by referring to the image-size correlating data corresponding to the so-obtained relative angle θ is the same as in the first embodiment. For example, if an image size $L_1$ is determined, in FIG. 2, as any given relative distance of lightings 15, reference points 17 and the scales 16 in the camera image 22, the distance from the intersection 23 of central axes of the camera 20 to an outer surface of the movable body 11 can be obtained from the graph of FIG. 3.

As described above, even though the position of the target face can not be known or expected in advance, the relative angle θ and the relative distance L can be obtained and the distance of the movable body 11 relative to the target face 50 can be kept constant in the state where the respective interfering bodies 13 of the movable body 11 are in contact with the target face 50. Therefore, the coordinates of attitude and existing point of the movable body 11 can be determined, thereby calculating the coordinates of the operating point of the movable body 11 and/or the effector with ease, even without relying on complicated three-dimensional calculations.

Accordingly, by using such an apparatus including the propellers 14, which can be freely moved in a space, rather than using an apparatus connected with articulating shafts from a reference point as seen in a manipulator, various operations targeting specific coordinates can executed. Also, upon inspection or the like, coordinates of any target point can be obtained.

Third Embodiment

FIG. 5 illustrates a third embodiment which relates to the first and second embodiments, and in which an actively drivable directional regulator is added to the monitor 18.

In FIG. 5, the movable body 11 used for measuring an operating point in the third embodiment is the same, in itself, as the movable body 11 shown in FIGS. 1 and 4. Again, like components are designated by like reference numerals, and their explanations will be omitted.

In the monitor 18 of the third embodiment, a rotating mechanism 26 adapted to rotate the main frame 19 about an axis and a lifting mechanism 27 configured to be expanded and contracted vertically along the axial direction are provided, such that the direction in which the camera 20 and the lighting 21 are directed can be regulated. In this way, the changed angle and vertical displacement of the camera 20 due to the rotating mechanism 26 and lifting mechanism 27 can be detected by a displacement meter (not shown).

In the third embodiment constructed as described above, the process, in which the movable body 11 is photographed by the camera 20 in a state where the interfering bodies 13 of the movable body 11 are moved to be in contact with the target face 50 while keeping the movable body 11 at a predetermined distance from the target face 50, is the same as in the first and second embodiments. However, in accordance with the third embodiment, the camera 20 can be directed in a proper orientation by actuating the rotating mechanism 26 and lifting mechanism 27 for enabling the measurement of the angle and displacement for the monitor 18, whereby the way in which the camera image 22 is taken can be adjusted such that it can be obtained, as shown in FIG. 6, from a different direction than that of the image of FIG. 2. Thus, the monitoring range can be widened without changing the installation of the monitor 18.

The verification of the camera image 22 taken on the camera 20 of the monitor 18 relative to the image-size correlating data and the calculation of coordinates can be performed as in the first and second embodiments. In this case, since the direction of the camera can be adjusted to obtain the camera image 22 which can be possibly adequate in the verification relative to the image-size correlating data, the amount of image data which has to be obtained in advance can be reduced, and the amount of operation for verifying the image-size correlating data relative to the actual camera image 22 can be decreased.

Fourth Embodiment

FIG. 7 illustrates a fourth embodiment which relates to the first and second embodiments, and in which a camera for visual inspection of the surface of a target face is provided to the movable body 11.

In the fourth embodiment, a camera 28 and a lighting 29, as a specific example of the effector 12, are provided to the movable body 11. In the monitor 18, similar to the monitor 18 as shown in FIG. 5 of the third embodiment, by actuating the rotating mechanism 26 and lifting mechanism 27 to enable the measurement of angle and displacement, the camera 20 for photographing the movable body 11 can be directed in a proper orientation, thereby adjusting the way in which an image is taken.

In FIG. 7, when the target face 50 is photographed using the camera 28 disposed on the movable body 11 while the respective interfering bodies 13 of the movable body 11 are in contact with the target face 50, a camera image 30 as shown in FIGS. 8 and 9 can be obtained. In the camera image 30, features 31, 32 in the target face 50 are shown. As these features 31, 32, for example, welding beats, grinder processed traces, cracks or cladding peeled traces can be utilized.

Since the interfering bodies 13 are in contact with the target face 50, the movable body 11 can be kept at a predetermined distance from the target face 50. Therefore, the dimensions in the camera image 30 to be taken on the camera 28 can also be kept constant. Thus, an image of a standard size lattice pattern 33 as shown in FIG. 10 can be prepared by grasping these dimensions in the camera image 30 in advance in order to use the pattern later as a reference scale.

After an image including the features 31, 32 on the target face 50 was obtained as a camera image as shown in FIG. 8 or 9, the standard size lattice pattern 33 is superimposed on the image showing the features 31, 32, as shown in FIG. 11, thereby measuring the dimensions of the features 31, 32.

At this time, the verification of the camera image 22 (FIG. 12) of the movable body 11 taken on the camera 20 of the monitor 18 relative to the image-size correlating data (FIG. 3) as well as the calculation of coordinates can be performed in the same manner as in the first or second embodiment. In this case, since the camera 20 can be directed in a proper orientation due to the mechanism of the monitor 18, the monitoring range can be widened without changing the installation of the monitor 18. In addition, since the orientation of the camera can be adjusted to obtain the camera image 22 which can be possibly adequate in the verification relative to the image-size correlating data, the amount of image data which has to be obtained in advance can be reduced, and the amount of operation for verifying the image-size correlating data relative to the actual camera image 22 can be decreased.

In this way, after executing the operating position measuring method according to the first or second embodiment to grasp the camera position of the movable body 11, the dimensions of the features 31, 32 can be measured, whereby the coordinates of their positions can be obtained.

In the monitor 18, even if the features 31, 32 would be shown in a perspective view such that the visual confirmation thereof be difficult, since the images of these features can be obtained by the camera 28 in the vicinity of the front of them, the measurement of the position and dimensions with high accuracy becomes possible.

Next, another aspect of inspection for carrying out visual inspection of a target face using the movable body 11 on which the camera 28 and the lighting 29 are provided as shown in FIG. 7 will be described with reference to FIGS. 13 to 16.

In FIG. 13, the camera 28 and the lighting 29 for visual inspection, as a specific example of the effector 12, are provided to the movable body 11. In the monitor 18, like the monitor 18 shown in FIG. 5 in the third embodiment, the rotating mechanism 26 and the lifting mechanism 27 for enabling the measurement of the angle and displacement are provided.

The difference of this aspect from that in FIG. 7 is that, rather than obtaining a reference scale such as the standard size lattice pattern 33 in advance, a land mark whose dimensions are already known is utilized. FIG. 13 illustrates a construction for positional measurement on the premise that a structure 35 is attached as a land mark onto the target face 50.

Figure 14:
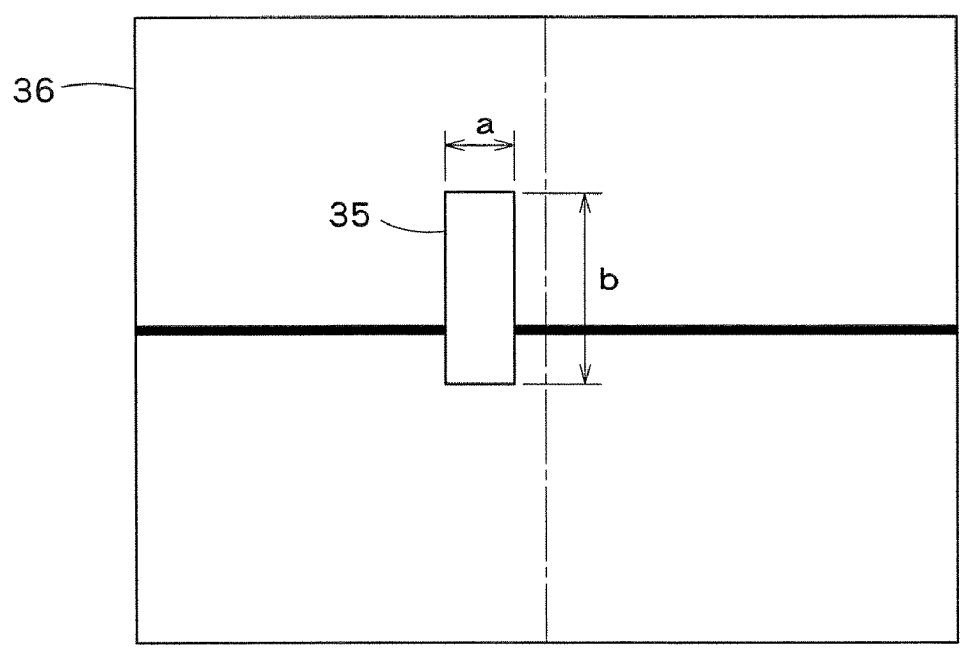
FIG. 14 is a diagram showing an image obtained from a camera on a movable body in the state shown in FIG. 13.

In this case, when the target face 50 is photographed by the camera 28 disposed on the movable body 11 while the interfering bodies 13 of the movable body 11 are in contact with the target face 50, a camera image 36, as shown in FIG. 14, can be obtained. If the structure 35 is expressed in the camera image 36 as shown in FIG. 14, since the dimensions a, b of the structure 35 are already known, any dimension on the camera image 36 can be measured by using these known dimensions a, b of the structure 35, in place of the reference scale such as the standard size lattice pattern 33, to perform comparison calculation.

It should be noted that the feature that the verification of the camera image 22 (FIG. 12) of the movable body 11 taken on the camera 20 of the monitor 18 relative to the image-size correlating data as well as the calculation of coordinates can be performed in the same manner as in the first or second embodiment is the same as in the case of employing the standard size lattice pattern 33 as a reference scale.

Figure 15:
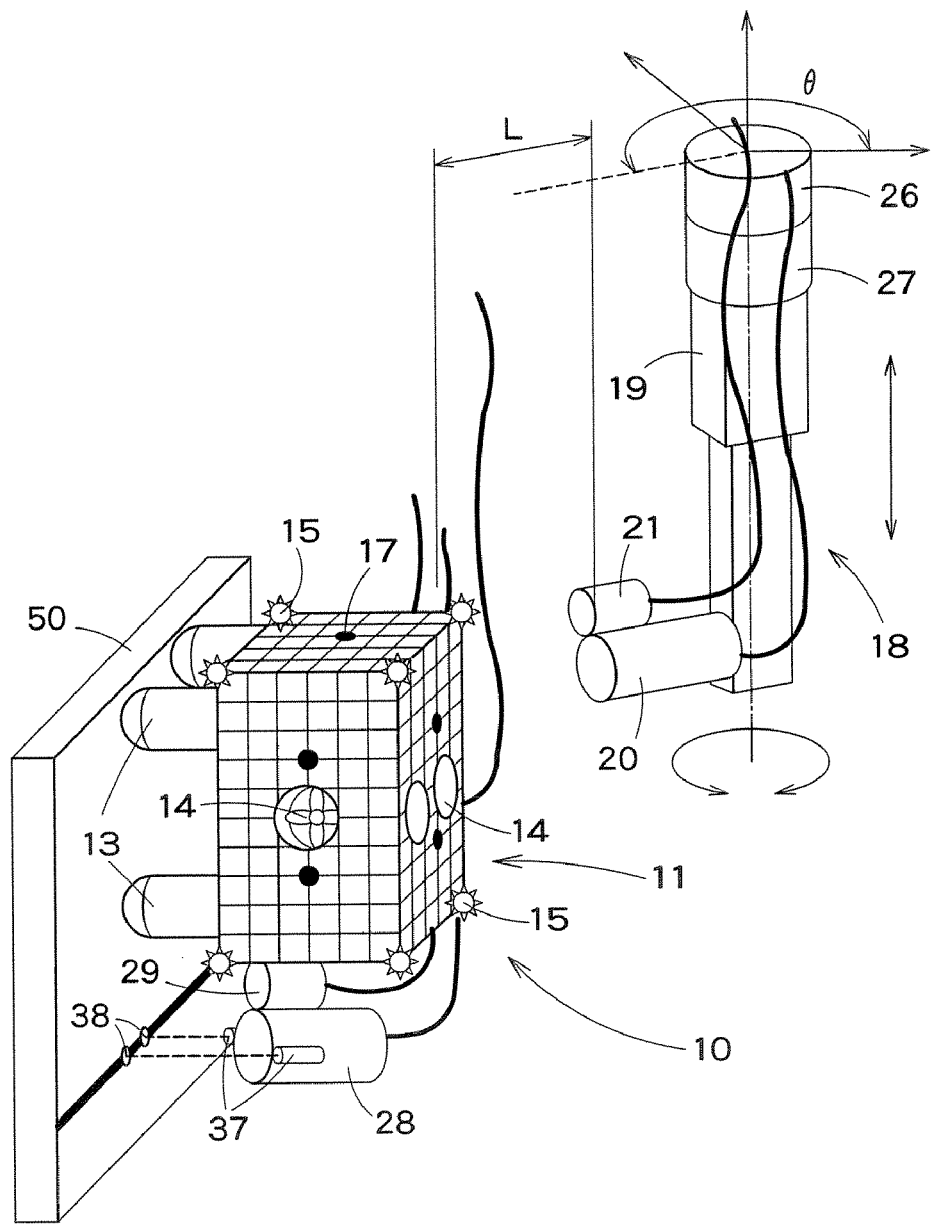
FIG. 15 is a diagram illustrating the entire construction of an apparatus for carrying out a method of measuring an operating position according to another example of the fourth embodiment of the present invention.

In the movable body 11 shown in FIG. 15, two light irradiating devices 37 adapted to generate light with directivity are provided on both sides of the camera 28 in parallel to the optical axis of the camera 28. The distance between the optical axes of the two light irradiating devices 37 was measured in advance, and is thus already known.

In FIG. 15, rather than using the structure 35 as a land mark provided on the target face 50 as shown in FIG. 13, the light irradiating devices 37 irradiates the target face 50 to create light points 38, 38 on the target face 50, whereby the dimensional measurement can be established based on comparative calculation using the distance c between the light points 38, 38 as a reference scale.

The movable body 11 is kept at a predetermined distance from the target face 50 due to the contact of the interfering bodies 13 with the target face 50. In this state, any specific dimension shown in a camera image 40 (FIG. 16) obtained by the camera 28 is kept constant. At this time, in the camera image 40, the light points 38, 38 to be created by parallel irradiation from the light irradiating devices 37 onto the target face 50 and reflection of light therefrom are expressed as shown in FIG. 16. Accordingly, the distance c between the light points 38, 38 can be grasped in advance because the light irradiating devices 37 are arranged in parallel to irradiate the target face 50 with light having directivity. Thus, any specific dimension shown in the camera image 40 can be measured by comparative calculation using the distance c between the light points 38, 38 as a reference scale.

Also in this aspect, the feature that the verification of the camera image 22 (FIG. 12) of the movable body 11 taken on the camera 20 of the monitor 18 relative to the image-size correlating data as well as the calculation of coordinates can be performed in the same manner as in the first or second embodiment is the same as in the case of employing the standard size lattice pattern 33 as a reference scale.

As described above, according to the fourth embodiment, by using the standard size lattice pattern 33 as shown in FIG. 11, or using the structure 35 as shown in FIG. 13 as a land mark, or otherwise by employing irradiation onto the target face with light having directivity from the light irradiating devices 37 provided on both sides of the camera 28 as shown in FIG. 15, any particular dimension can be measured from an image taken on the camera provided on the movable body 11. In the monitor 18, even if the features to be inspected are shown in a perspective view, thus making the visual confirmation be difficult, since the images of these features can be obtained by the camera 28 in the vicinity of the front of them, the measurement of the position and dimensions with high accuracy becomes possible. In the case of employing the structure 35 as a land mark or otherwise of utilizing the light irradiation, since the standard size lattice pattern 33 is not necessarily obtained in advance, the preparation becomes simple and easy. In the case of grasping the distance between the light points 38, 38 using the image-size correlating data, correction along the direction perpendicular to the target face may be possible based on the camera image 40.

Fifth Embodiment

In the first embodiment, the relative position between the target face 50 and the monitor 18 was already known, while in a fifth embodiment of this invention, the target face 50 itself is unknown. Therefore, in the fifth embodiment, the unknown profile of the target face 50 is first measured or obtained, and the measurement for the operating position and dimensions is then performed. The operation according to this embodiment will be described with reference to FIG. 17.

In FIG. 17, an apparatus for executing the profiling measurement of the unknown target face 50 comprises a distance measuring device 42, in place of the lighting 21 and the camera 20, attached to the main frame 19 of the monitor 18 which includes the rotating mechanism 26 and the lifting mechanism 27 as shown in FIG. 5. This embodiment features that the profiling measurement of the target face 50 is performed prior to the execution of the first embodiment. The construction of this embodiment other than this point is the same as the first embodiment.

In operation, the monitor 18 including the distance measuring device 42 is provided in an appropriate position relative to the target face 50 to measure the distance therebetween. Thereafter, based on the measured data, in the same manner as in the first embodiment, the movable body 11 is moved to contact with the target face 50, followed by photographing the movable body using the camera 20 of the monitor 18, thereby performing the measurement of the position and dimensions from the camera image.

According to the fifth embodiment, since the dimensional measurement is carried out after having grasped the relative distance and dimensions with respect to the unknown target face 50, the amount of image data which has to be obtained in advance can be reduced, and the amount of operation for verifying the image-size correlating data relative to the actual camera image can be decreased.

Sixth Embodiment

Next, a sixth embodiment will be described with reference to FIG. 18, which relates to the first and second embodiments and in which the monitor 18 is not needed.

Figure 18:
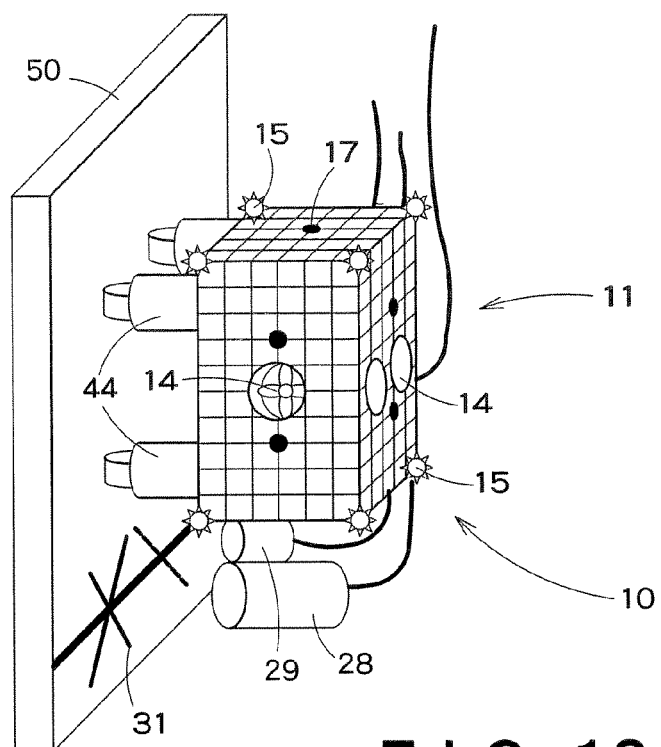
FIG. 18 is a diagram illustrating the entire construction of an apparatus for carrying out a method of measuring an operating position according to one example of the sixth embodiment of the present invention.
Figure 19:
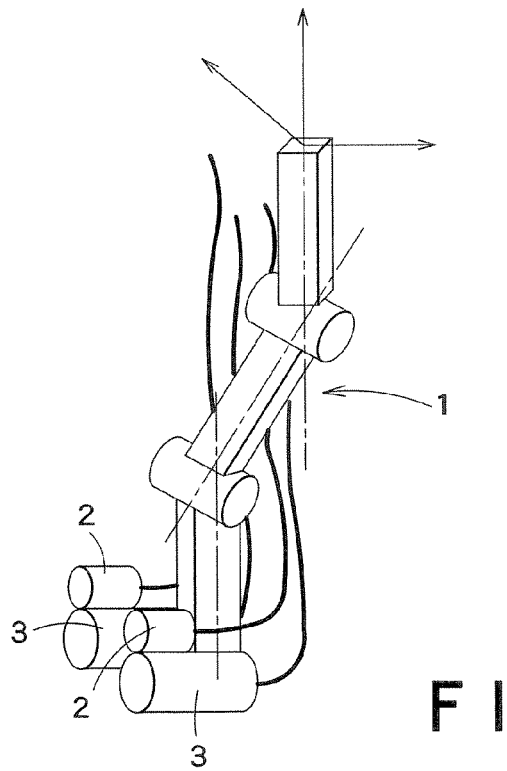
FIG. 19 is an illustration of a conventional method of measuring a position and dimensions using an arm.

In this embodiment shown in FIG. 18, the movable body 11 includes the camera 28 and the lighting 29 as an effector for performing a visual inspection, and in addition to the propellers 14 adapted to press the movable body 11 against the target face 50, the movable body 11 includes running mechanisms 44 for moving the movable body 11 along the target face 50 after the movable body 11 is pressed against the target face 50. The running mechanisms 44 include means (not shown) for measuring the running position of the movable body 11, which can measure a relative position upon running from a reference position on the target face 50. In this case, the process in which image data (not shown) are obtained by using the camera 28 on the movable body 11 under an environment related to a reflective index of light similar to that around the operating site depending on the angle and distance between the camera 28 and the target face 50 and in which the standard size lattice pattern 33 as shown in FIG. 10 prepared to match the size of the image is obtained in advance is the same as the fourth embodiment. Also, the optical axis of the camera 28 attached to the movable body 11 and the relative position and angle at which the running mechanisms 44 are attached are already known.

In accordance with this embodiment, since the movable body 11 is kept at a predetermined distance from the target face 50 by contacting with the target face 50 via the running mechanisms 44, the standard size lattice pattern 33 as shown in FIG. 10 can be prepared, as in the fourth embodiment, by grasping in advance the dimensions in an image obtained by the camera 28. As shown in FIG. 8 or 9, after obtaining an image of the feature 31 on the target face 50, the standard size lattice pattern 33 is superimposed on the image showing the feature 31, as shown in FIG. 11, thus measuring the dimensions of the feature 31. At this time, by the measurement of the running position due to the running mechanism 44, the relative coordinates can be measured on the target face using the feature point of the movable body 11 as a point of reference, and the position of the camera 28 on the movable body 11 can also be grasped, thereby obtaining the positional coordinates of the feature point 31.

In the case of this embodiment where a position measurement function is provided in the movable body 11, the monitor 18 is not necessarily used as in the first embodiment, and the positional coordinates of the feature point 31 can be measured with ease by using such a position measurement function of the movable body 11 and the standard size lattice pattern 33.

Furthermore, even in the case where the feature point 31 becomes a perspective view and difficult to identify through the visual confirmation from a photograph obtained by the camera 20 of the monitor 18, images can be obtained in the vicinity the front of the feature point 31 using the camera 28 of the movable body 11, thereby enabling highly accurate measurement of the position and dimensions.

The invention claimed is:

1. A method of measuring an operating position for performing maintenance including inspection and repair through remote operation to a target face in which a general profile of the surface is already known, the method comprising:

contacting a movable body capable of being kept at a constant relative distance and relative angle with respect to the target face and having reference points for use in positional measurement on a surface of the movable body;

providing a monitor, having a camera and lighting, at any given reference point whose relative position with respect to the target face is already known;

accumulating in advance image data to be obtained by photographing the movable body, under an optical environment similar to that around the target face, at any given relative angle or relative distance, between the movable body and the monitor for the positional measurement;

obtaining in advance correlating data, based on the image data, for determining a one to one correlation between the relative distance, at any given relative angle or relative distance, between the movable body and the monitor for the positional measurement and the distance and dimensions on the surface of the photographed object in the image;

measuring the relative angle between the photographed object and the monitor;

photographing the movable body using the camera of the monitor, and calculating the relative distance between the monitor and the movable body by comparing the distance and dimensions between the reference points in the image with the correlating data coincident with the measured relative angle; and calculating the operating position of the movable body for the positional measurement, based on the relative position, relative distance and relative angle of the monitor.

2. A method of measuring an operating position for performing maintenance including inspection and repair through remote operation to a target face in which a general profile of the surface is unknown, the method comprising:

contacting a movable body capable of being kept at a constant relative distance and relative angle with respect to the target face and having reference points for use in positional measurement on a surface of the movable body;

providing a monitor, having a camera and lighting, at the origin of coordinate axes;

accumulating in advance image data to be obtained by photographing the movable body, under an optical environment similar to that around the target face, at any given relative angle or relative distance, between the movable body and the monitor for the positional measurement;

obtaining in advance correlating data, based on the image data, for determining a one to one correlation between the relative distance, at any given relative angle or relative distance, between the movable body and the monitor for the positional measurement and the distance and dimensions on the surface of the movable body in the image;

obtaining the relative angle by comparing the image of the photographed movable body with the image data;

photographing the movable body using the camera of the monitor, and calculating the relative distance between the monitor and the photographed object by comparing the distance and dimensions between the reference points in the image with the correlating data coincident with the obtained relative angle; and calculating the operating position of the movable body for the positional measurement, based on the relative position, relative distance and relative angle of the monitor.

3. The method of measuring an operating position according to claim 1 or 2, wherein an auxiliary camera and a lighting are provided to the movable body, and the method further comprising:

obtaining a relative distance and a relative angle between the auxiliary camera and the target face;

assuming a target face corresponding to the distance and angle measured in advance between the auxiliary camera and the target face, and preparing a scale image data in advance, on which a scale display of a mark corresponding to specific dimensions or coordinates is provided; and measuring dimensions of a shape of a feature point on the target face by superimposing the scale image data on an image of an actual target face photographed using the auxiliary camera.

4. The method of measuring an operating position according to claim 3, wherein a scale display of dimensions obtained from a proportional calculation is provided in an image of the target face, using a mark of a known structure or pattern as a reference, which is provided on the target face.

5. A method of measuring an operating position for performing maintenance including inspection and repair through remote operation to a target face in which a general profile of the surface is unknown, the method comprising:

contacting, with the target face, a movable body for the positional measurement, which can be kept at a constant relative distance and relative angle with respect to the target face and includes a running mechanism for self-propelled operation, a camera and a lighting;

accumulating in advance image data to be obtained by photographing the target face, at any given relative angle and relative distance, between the camera of the movable body and the target face;

preparing a standard size lattice as a scale display of dimensions in an image obtained from the image data coincident with the relative distance and the relative angle by comparing the image of the photographed target face and the image data; and measuring the dimensions and position of a shape of a feature point shown in the image of the target face while superimposing the standard scale lattice on the image and allowing the movable body to be self-propelled.

6. The method of measuring an operating position according to any one of claims 1, 2 or 5, wherein when there is a feature point, made of welding beats, grinder processed traces, cracks or cladding peeled traces, on the target face, the range for measuring dimensions is enlarged by moving the movable body to be measured for the position and arranging at least two images in which photographing ranges are overlapped.

7. An apparatus of measuring an operating position for performing maintenance including inspection and repair through remote operation to a target face in which a general profile of the surface is known or unknown, the apparatus comprising:
- a working unit including a movable body which includes reference points for positional measurement on a surface of the movable body and can be freely moved by remote operation, a unit for constantly keeping the relative distance and the relative angle between the target face and the movable body, and an effector for effecting predetermined operations to the target face;
- a monitor which includes a camera and lighting and is provided at any given reference point;
- an image data storing unit for accumulating in advance image data to be obtained by photographing the movable body, under an optical environment similar to that around the target face, at any given relative angle or relative distance, between the movable body and the monitor for the positional measurement;
- a correlating data storing unit for obtaining and accumulating in advance correlating data, based on the image data, for determining a one to one correlation between the relative distance, at any given relative angle or relative distance, between the movable body and the monitor for the positional measurement and the distance and dimensions between the reference points on the surface of the movable body in the image;
- a verification unit for obtaining the relative angle, by calculating the relative distance between the monitor and the movable body by comparing the distance and dimensions between the reference points in the image of the movable body photographed by the camera of the monitor and the correlating data corresponding to the measured relative angle, or by comparing the image of the photographed movable body with the image data corresponding to the measured relative distance; and
- a position computing unit for calculating the position of the movable body for the positional measurement, based on the relative position, relative distance and relative angle of the monitor.

8. The apparatus of measuring an operating position according to claim 7, wherein the monitor is provided with a directivity adjusting mechanism, with respect to at least one axis, the directivity adjusting mechanism being adapted to direct the camera and the lighting in an appropriate orientation and capable of measuring the displacement.

9. The apparatus of measuring an operating position according to claim 7, wherein the effector of the working unit for positional measurement is provided with a camera and a lighting, and includes at least any one of an interfering structure for constantly keeping the distance relative to the target face, a unit for measuring the distance, and a control unit for adjusting the distance.

10. The apparatus of measuring an operating position according to claim 7, wherein the effector of the working unit for positional measurement is provided with optical sources with directivity for illuminating at least two points of the target face to be depicted in an image given by the camera.

11. The apparatus of measuring an operating position according to claim 7, wherein, when the relative distance, relative angle, surface profile, and coordinates with respect to the target face are unknown, the monitor includes a distance measuring unit for providing measurement of the relative distance using ultrasound or laser based on a reference to be defined in the vicinity of the initially provided position of the camera.

12. An apparatus of measuring an operating position for performing maintenance including inspection and repair through remote operation to a target face in which a general profile of the surface is known, the apparatus comprising:
- a measurement working unit including a movable body which includes reference points for positional measurement on a surface of the movable body and can be freely moved by remote operation, a unit configured to constantly keep the relative distance and the relative angle between the target face and the movable body, and a camera and lighting for performing a visual inspection of the target face;
- an image data storing unit configured to accumulate in advance image data to be obtained by photographing the target face, under an optical environment similar to that of the target face, at any given relative angle or relative distance, between the camera of the measurement working unit and the target face;
- a verification unit configured to obtain the relative distance and the relative angle, by comparing an image of the photographed target face with the image data; and
- a position computing unit configured to prepare a standard size lattice to be used as a reference scale of dimensions in the image based on the relative distance and the relative angle and calculate the dimensions and the position of a shape of a feature point shown in the image of the target face while superimposing the standard scale lattice on the image and allowing the movable body to be self-propelled.

* * * * *